Nov. 26, 1946.  W. H. JOYCE, JR  2,411,792
DRIER
Original Filed May 24, 1941

WILLIAM H. JOYCE, JR.,
INVENTOR

BY
ATTORNEY

Patented Nov. 26, 1946

2,411,792

UNITED STATES PATENT OFFICE 2,411,792

DRIER

William H. Joyce, Jr., Pasadena, Calif., assignor to Joyce, Inc., Pasadena, Calif., a corporation of California Original application May 24, 1941, Serial No. 395,050, now Patent No. 2,377,631, dated June 5, 1945. Divided and this application June 5, 1942, Serial No. 445,901

2 Claims. (Cl. 34—207)

My invention relates to a vertical hot air drier and is a division of my copending application Serial No. 395,050 filed May 24, 1941, now Patent Number 2,377,631, dated June 5, 1945, for Method and apparatus for manufacturing articles from preformed parts.

In the manufacture of shoes for example, it is generally necessary to let the shoes mature two or three days before pulling the last. This requires large inventories on hand, an excessive number of lasts and a large floor space which cannot be utilized for the purpose of manufacturing.

An object of my invention is to provide a drier in which a large number of shoes may be properly cured, employing a minimum amount of floor space and reducing the time for curing the shoes to a period of two or three hours. To accomplish this purpose I have devised a vertical hot air drier in which shoes may be continuously dried and cured and yet occupy a minimum of floor space.

The conventional hot air driers most commonly in use require the articles being dried or cured to travel on a horizontal plane. If a large number of shoes are being cured and require a relatively long period for curing it will readily be seen that such a horizontal drier either occupies an excessive amount of floor space, or if overhead reduces skylight area, is difficult of access, and does not lend itself well to an assembly line wherein work operations are performed preceding and subsequent to, the travel of the shoes through the drier.

A still further object of my invention is to provide a novel form of work basket support in the drier adapted to cooperate with attaching elements on work carriers for automatic engagement and disengagement of the carriers by the traveling sprocket chain hooks.

Figure 1:
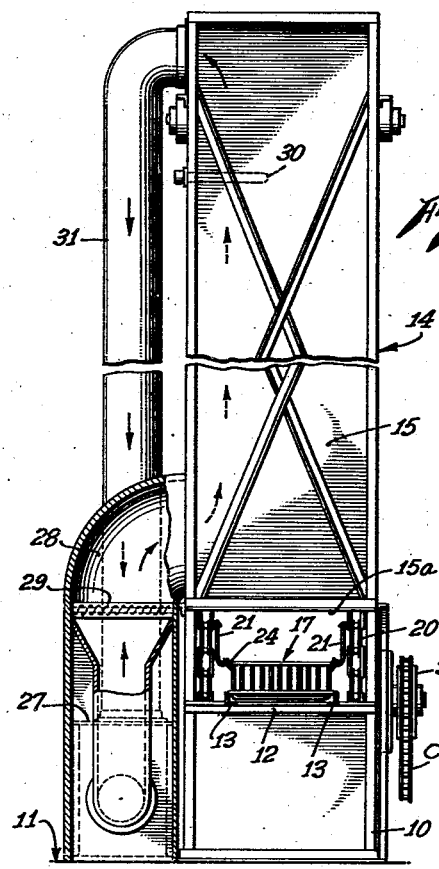
Figure 1 is a vertical end view of the drier.
Figure 2:
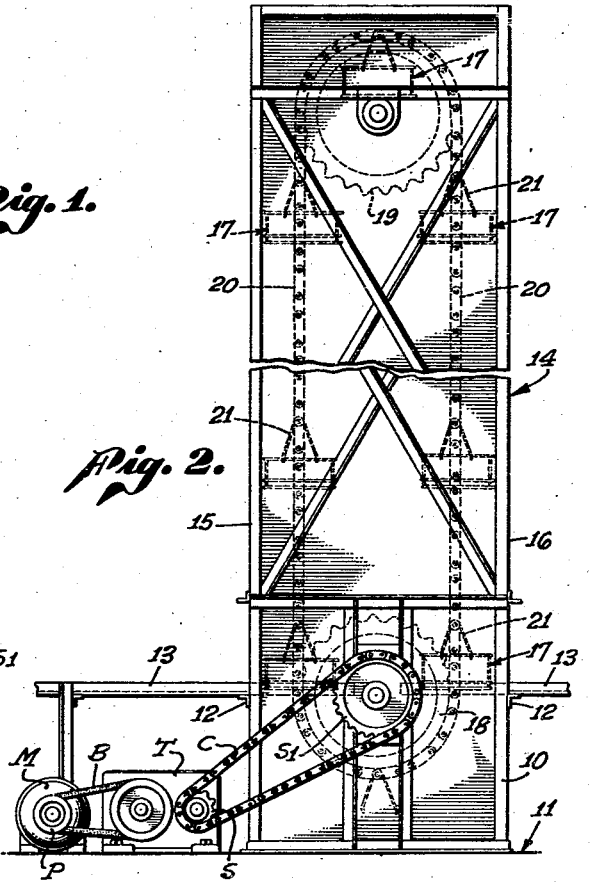
Figure 2 is a side elevation of the drier.
Figure 3:
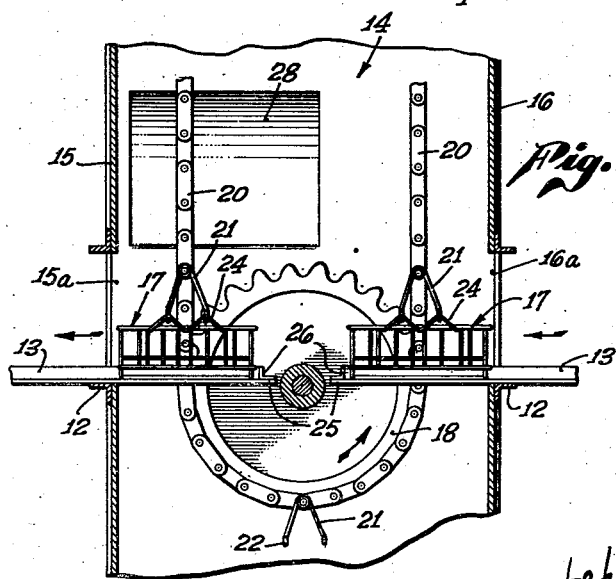
Figure 3 is a fragmentary cross section showing the means for loading and unloading the work carrying basket in the drier.
Figure 4:
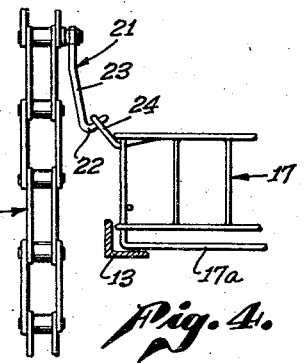
Figure 4 is a fragmentary enlarged cross section showing the details of the means employed for carrying the basket to the drier.

Referring to Figures 1 to 4, a supporting frame 10 is mounted on the floor 11 of the work room and provides support for a crosspiece 12. A track 13 is laid on the crosspiece 12, which is preferably at normal work table level. Track 13 may comprise a pair of spaced angle members forming guides for baskets 17.

A vertical tower 14 comprised of the frame 10 and sheet metal walls forms a drying chamber. The end faces 15 and 16 of the tower are open in the region of the track as illustrated at 15a and 16a so that baskets 17 may be pushed in at one side and withdrawn from the other side of the drier.

A pair of large sprockets 18 are suitably mounted at the lower part of the tower with a common axis substantially level with the track 13, and a corresponding pair of sprockets 19 are mounted at the upper part of the tower. Endless chains 20 are trained over the sprockets 18 and 19. The lower sprockets are driven by any suitable source of power such as an electric motor M which may have an adjustable V pulley P driving a belt B and operating through a variable speed transmission box T to reduce the speed, and sprockets S and S1 and a chain C. Any other power source and any suitable means of gear reduction, but preferably with a change of speed control of any conventional type may be used.

On regularly spaced links of chains 20 are swiveled hook members 21, each comprising a bifurcated rod or wire, each leg of which terminates in a hook end 22. I prefer to bend the legs outwardly as indicated at 23 to better clear the chains and also to facilitate the engagement of the hook ends 22 with loops 24 on the baskets 17. The hook members 22 hang vertically by gravity, there being corresponding hook members on each of the two chains whereby each pair of hook members captures a work basket if there is one present, as the hook members rise with the chains and hold the baskets in a continuously horizontal position while the chains travel upwardly and over the upper sprocket 19 and descend to the track section 13 on the opposite side of the drier. As the descending chains and supporting hook members deposit the basket on the track the hooks automatically become disengaged and travel on downwardly and around the lower sprocket 18. In use, an operator pushes a basket along track 13 into place to be engaged by the hooks on their upward travel, the basket being guided by the track, and removes the basket after it has been deposited at the completion of the journey. Stop members 26 are placed across the track section ends 25 to position the baskets as they are pushed into the drier and to prevent the baskets from being inadvertently dislodged at the time of their removal.

I provide a blower 27, and a heating chamber 28 incorporating an electric heating element 29 controlled by a thermostat 30, which is conventionally wired in a manner not illustrated, by which heated air is introduced at the lower end of the tower as indicated by the arrows in Figure 1, but at a point above the openings 15a and 16a. A duct 31 provides for the return of air from the upper part of the tower to the blower for recirculation. Any other form of heating and circulating arrangement may be employed, as conditions indicate.

The baskets 17 may be formed of wire, sheet metal, fiber, plastics, or any other suitable material. They are preferably open to allow complete access of heated air to the shoes or other burden in the baskets and are preferably formed with runners 17a for sliding support on the track 13. The loops 24 should be in duplicate at each end of the basket, and sufficiently spaced apart to assure the baskets of being maintained in a level position while supported by the hook members 21. Further details are contained in my copending application Ser. No. 395,050 and Ser. No. 445,902 filed June 5, 1942, now Patent Numbers 2,377,631 and 2,367,218, respectively.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

The essential features of the drier are the means for automatically picking up the baskets, conducting them through the vertical heating chamber, and automatically depositing them at the end of their travel, with means for forcing through the chamber a circulation of heated air the temperature of which is controlled.

I have referred previously to the drying and curing of shoes, as an effective example of a use to which my improved drier may be advantageously employed; this is by way of example only, and is not intended to impose structural limitations on the device, which is contemplated as a drier having the structural and functional features shown and described, for whatever use it may be suitable.

Certain of the advantages of the present invention will appear from a reading of the description hereinbefore. Other advantages arise from applicant's arrangement of a drying tower with work openings (never closed) for introducing and removing work baskets positioned below the point of directing preheated air into the tower and the provision of means for returning substantially all of the heated air in the tower to the fan and heater to be reheated considerably less before it is returned to the tower than it was heated the time before.

Having described my invention, what I claim as new and desire to secure by Letters Patent is:

1. A vertical drier for articles in work baskets comprising: a tower extending upwardly from a floor base forming a drying chamber and having doorless openings at work level elevated above the floor for introducing baskets at one side and removing them from the other and having an air inlet above said openings, a track including guide elements for said baskets extending into the tower from both sides through said openings, a stop member on said track at the introductory opening to position said baskets, vertical means for automatically picking up said baskets containing articles to be dried from said track, moving them through a vertical path in the drying chamber and depositing them on the track at the opposite side of the tower, and means for forcing through the chamber a circulation of heated air, said last mentioned means comprising a heating element, a blower, a conduit connected to said blower for directing air through the heating element and into the tower at a point above said openings, and a return duct carrying all of the air from the top of the tower to the blower for reheating and recirculation.

2. A vertical drier for articles in work baskets comprising: a tower extending upwardly from a floor base forming a drying chamber and having doorless openings at work level elevated above the floor for introducing baskets at one side and removing them from the other, a track including guide elements extending into the tower from both sides through said openings, said track having a stop member within said tower to position said baskets at the introductory opening, vertical traveling means for automatically picking up baskets from said track, move them through a vertical path in the drying chamber and deposit them on the track at the opposite side of the tower, said means including an endless chain outside the track on each side thereof, upper and lower sprocket shafts, upper and lower sprockets on said respective shafts supporting the chains, the lower sprockets being mounted with the lower sprocket shaft substantially level with the track and entirely above the floor, one of said sprockets driving the chains, and hook members swiveled on spaced links of the chain for engaging the baskets for suspension support on said chains.

WILLIAM H. JOYCE, JR.